United States Patent
Tang et al.

(10) Patent No.: US 12,235,763 B2
(45) Date of Patent: Feb. 25, 2025

(54) DATA PROCESSING METHOD, DEVICE, COMPUTER APPARATUS AND STORAGE MEDIUM

(71) Applicants: Xi'an Jiaotong University, Shaanxi Province (CN); Douyin Vision Co., Ltd., Beijing (CN); Lemon Inc., Grand Cayman (KY)

(72) Inventors: Wei Tang, Los Angeles, CA (US); Chi Zhang, Shaanxi Province (CN); Fangxing Yu, Shaanxi Province (CN); Menghan Li, Shaanxi Province (CN); Bo Wang, Beijing (CN); Weiguo Wu, Shaanxi Province (CN); Fei Liu, Los Angeles, CA (US)

(73) Assignees: Xi'an Jiaotong University, Shaanxi Province (CN); Douyin Vision Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/741,900

(22) Filed: Jun. 13, 2024

(65) Prior Publication Data
US 2025/0013567 A1    Jan. 9, 2025

(30) Foreign Application Priority Data
Jul. 6, 2023    (CN) .......................... 202310824050.0

(51) Int. Cl.
*G06F 12/08*    (2016.01)
*G06F 12/0802*    (2016.01)

(52) U.S. Cl.
CPC ................................ *G06F 12/0802* (2013.01)

(58) Field of Classification Search
CPC .................................................. G06F 12/0802
See application file for complete search history.

(56) References Cited

U.S. PATENT DOCUMENTS

| 8,593,748 B1 | 11/2013 | Bandic et al. |
| 10,802,762 B1 | 10/2020 | Gray et al. |
| 2014/0160514 A1* | 6/2014 | Matsuyama ....... H04N 1/32609 358/1.14 |

FOREIGN PATENT DOCUMENTS

| CN | 109697033 B | 1/2022 |
| CN | 115509444 A | 12/2022 |
| CN | 113900590 B | 1/2023 |

OTHER PUBLICATIONS

Chen S.H. et al., "A New Sequential-write-constrained Cache Management to Mitigate Write Amplification for SMR Drives," Proceedings of the Second Workshop on Distributed infrastructures for Deep Learning, Apr. 2019 pp 599-606, XP03059210003.

(Continued)

*Primary Examiner* — Jae U Yu

(57) ABSTRACT

The present disclosure provides a data processing method, a device, a computer apparatus and a storage medium, wherein the method includes: in response to a target disk receiving at least one write request within a preset time period, determining a size threshold value for classifying a data update type according to a size of write data respectively indicated by each write request; determining a data update type corresponding to each write request according to a size of each write request and the size threshold value; dividing write data of the write request to obtain a data block according to a preset data block size, and caching the data block in a cache region of the target disk corresponding to the data update type, the target disk has multiple types of cache regions configured therein, different cache regions are configured to support caching of data with different update frequencies.

13 Claims, 2 Drawing Sheets

(56) References Cited

OTHER PUBLICATIONS

Extended European Search Report for European Application No. 24181568.7, mailed Oct. 30, 2024, 12 pages.

Liang Y.P., at at, "Mitigating Write Amplification issue of SMR Drives via the Design of Sequentiai-write-constrained Cache," Journal of Systems Architecture, Aug. 2019, vol. 99, 11 pages, XP085848259.

Ma C., et at, "Alleviating Hot Data Write Back Effect for Shingled Magnetic Recording Storage Systems," IEEE Transactions on Computer-aided Design of Integrated Circuits and Systems, Dec. 2019, vol. 38 (12), pp. 2243-2254, XP011757290.

Pan Y., "Reinforcement Learning-Assisted Cache Cleaning to Mitigate Long-Tail Latency in DM-SMR," 2021 58th ACM/IEEE Design Automation Conference (DAC), Dec. 2021, pp. 103-108, XP034013271.

Yang M.C., et al., "On Improving the White Responsiveness for Host-Aware SMR Drives," IEEE Transactions on Computers, Jan. 2019, vol. 68 (1), pp. 111-124, XP011700247.

\* cited by examiner

DATA PROCESSING METHOD, DEVICE, COMPUTER APPARATUS AND STORAGE MEDIUM

CROSS-REFERENCE TO RELATED APPLICATION(S)

The present application claims the priority of Chinese Patent Application No. 202310824050.0, filed on Jul. 6, 2023, and the disclosure of the above-mentioned Chinese Patent Application is incorporated herein by reference as a part of the present application.

TECHNICAL FIELD

The present disclosure relates to the technical field of data processing, in particular, to a data processing method, a device, a computer apparatus and a storage medium.

BACKGROUND

The amount of data in the big data era is growing exponentially, and shingled magnetic recording (SMR) disk, as a cost-effective storage medium, can achieve high capacity storage by partially overlapping data tracks on the disk. However, write operations performed in SMR disk would destroy the valid data on adjacent tracks, and therefore, during the process of writing data, the valid data of adjacent tracks must be read into the internal memory, and the data to be modified is combined with the newly written data, and then written back to the storage region of the SMR disk.

Whereas for host managed-SMR (HM-SMR), a reserved conventional magnetic recording (CMR) region is served as a persistent cache region for caching data. Whereas the persistent cache region needs to be timely cleaned to ensure that there has available space. Therefore, how to effectively clean the CMR region in HM-SMR disk is an urgent problem to be solved.

SUMMARY

Embodiments of the present disclosure at least provide a data processing method, a device, a computer apparatus and a storage medium.

An embodiment of the present disclosure provides a data processing method, including:
  in response to a target disk receiving at least one write request within a preset time period, determining a size threshold value for classifying a data update type according to a size of write data respectively indicated by each write request of the at least one write request;
  determining a data update type corresponding to each write request according to a size of the each write request and the size threshold value; wherein the data update type is used to characterize a frequent degree of data update of a write request;
  dividing write data of the write request to obtain a data block according to a preset data block size, and caching the data block in a cache region of the target disk corresponding to the data update type, wherein the target disk has multiple types of cache regions configured therein, and different cache regions are configured to support caching of data with different update frequencies.

In an optional implementation, the cache regions include a high frequency cache region for caching a write data corresponding to a write request of a first type and a low frequency cache region for caching a write data corresponding to a write request of a second type;
  the caching the data block in the cache region of the target disk corresponding to the data update type includes:
    determining that the data update type of the write request is the first type in the case that a size of the write request is less than or equal to the size threshold value, otherwise, determining that the data update type of the write request is the second type;
    caching each data block of the write request of the first type in the high frequency cache region; and caching each data block of the write request of the second type in the low frequency cache region.

In an optional implementation, the caching each data block of the write request of the first type in the high frequency cache region includes:
  for each data block to which the write request of the first type corresponds, in a case that the data block is the same as a cached data block in the target disk, determining that a latest storage location of the data block in the high frequency cache region based on a marked attribute information of the data block in the target disk and a historical storage location of the data block in the high frequency cache region; wherein the attribute information is used to indicate an update period length information of the data block.

In an optional implementation, the marked attribute information of the data block in the target disk is a first attribute information; the first attribute information indicates that the data block is a metadata block that is written to the target disk for a first time, corresponding to a write request being of the first type, and does not exist within a resident stack of the high frequency cache region; the resident stack is configured to store the metadata block;
  the determining the latest storage location of the data block in the high frequency cache region according to the marked attribute information of the data block in the target disk and the historical storage location of the data block in the high frequency cache region, includes:
    updating the first attribute information corresponding to the data block to a second attribute information, and determining a traffic data block corresponding to the metadata block; wherein the second attribute information indicates that the data block is a traffic data block with an update period greater than or equal to a first set threshold value;
    in a case that the metadata block does not exist in the resident stack of the high frequency cache region and is updated to the second attribute information, determining that a latest storage location of the metadata block is a location of the resident stack, and determining that a storage location of the traffic data block in the high frequency cache region is a location of a filter stack; wherein the resident stack is configured to store the metadata block; the filter stack is configured to store the traffic data block.

In an optional implementation, the marked attribute information of the data block in the target disk is a second attribute information; the second attribute information indicates that the data block is a traffic data block with an update period greater than or equal to a first set threshold value;
  the determining the latest storage location of the data block in the high frequency cache region based on the marked attribute information of the data block in the target disk and the historical storage location of the data block in the high frequency cache region, includes:

updating the second attribute information of the data block to a third attribute information in a case that the data block exists in both the resident stack and the filter stack; wherein the third attribute information indicates that the data block is a traffic data block with an update period smaller than a second set threshold value; the resident stack and the filter stack are configured to store traffic data blocks in the data block, and an update period of the traffic data block stored in the resident stack is shorter than an update period of the traffic data block stored in the filter stack; the second set threshold value is less than or equal to the first set threshold value;

determining that the latest storage location of the data block is a most recently used end of the resident stack.

In an optional implementation, the marked attribute information of the data block in the target disk is a second attribute information; the second attribute information indicates that the data block is a traffic data block having an update period greater than or equal to a first set threshold value;

the determining the latest storage location of the data block in the high frequency cache region based on the marked attribute information of the data block in the target disk and the historical storage location of the data block in the high frequency cache region, includes:

in a case that the data block is migrated from a resident stack to a filter stack, determining that the latest storage location of the data block is a most recently used end of the resident stack; wherein the resident stack and the filter stack are configured to store traffic data blocks in the data block, and an update period of the traffic data block stored in the resident stack is shorter than an update period of the traffic data block stored in the filter stack.

In an optional implementation, the marked attribute information of the data block in the target disk is a third attribute information; the third attribute information indicates that the data block is a traffic data block with an update period smaller than a second set threshold value;

the determining the latest storage location of the data block in the high frequency cache region based on the marked attribute information of the data block in the target disk and the historical storage location of the data block in the high frequency cache region, includes:

in a case that the data block is a traffic data block with an update period smaller than the second set threshold value and is stored to a resident stack, determining that the latest storage location of the data block is a most recently used end of the resident stack; wherein the resident stack is configured to store the traffic data block.

In an optional implementation, the marked attribute information of the data block in the target disk is a fourth attribute information; the fourth attribute information indicates that the data block is a metadata block in which a traffic data block is moved out of a filter stack of the high frequency cache region; the filter stack is configured to store the traffic data block;

the determining the latest storage location of the data block in the high frequency cache region based on the marked attribute information of the data block in the target disk and the historical storage location of the data block in the high frequency cache region, includes:

updating the fourth attribute information of the data block to a third attribute information; wherein the third attribute information indicates that the data block is a traffic data block having an update period smaller than a second set threshold value;

in a case that the data block is a metadata block moved out of a filter stack of the high frequency cache region and updated to the third attribute information, determining that the latest storage location of the data block is a most recently used end of a resident stack in the high frequency cache region; wherein the resident stack is configured to store the traffic data block; and an update period of the traffic data block stored in the resident stack is shorter than an update period of the traffic data block stored in the filter stack.

In an optional implementation, in a case that a number of data blocks cached in the low frequency cache region reaches a set threshold value, clearing data blocks in the low frequency cache region includes:

in a case that a number of data blocks cached in the low frequency cache region reaches a third set threshold value, determining a weight of each data block according to the number of the data blocks cached in the low frequency cache region and a fragmentation degree corresponding to each data block; wherein the fragmentation degree is used to indicate a degree of dispersion of the data block in the low frequency cache region; the fragmentation degree is determined according to a number of data blocks in a persistent storage region, a number of data blocks pointed to by a write pointer, and a number of data blocks cached in the low frequency cache region of the target disk;

writing a data block having a weight that meets a first preset condition back to the persistent storage region according to the weight of each data block.

In an optional implementation, the method further includes:

in a case that a number of data blocks cached in the high frequency cache region reaches a fourth set threshold value, caching a data block with an arrangement location meeting a second preset condition into the low frequency cache region according to an arrangement order of data blocks at a least recently used end of a filter stack; wherein the filter stack is used to store traffic data blocks among the data blocks.

An embodiment of the present disclosure provides a data processing device, including:

a first determining module, configured to, in response to a target disk receiving at least one write request within a preset time period, determining a size threshold value for classifying a data update type according to a size of a write data respectively indicated by each write request of the at least one write request;

a second determining module, configured to determine a data update type corresponding to each write request according to a size of the each write request and the size threshold value; wherein the data update type is used to characterize a frequent degree of data update of a write request; and a caching module, configured to divide write data of the write request to obtain a data block according to a predetermined data block size and cache the data block in a cache region of the target disk corresponding to the data update type, wherein the target disk has multiple types of cache regions configured therein, and different cache regions are configured to support caching of data with different update frequencies.

An embodiment of the present disclosure provides a computer apparatus including: a processor, a memory and a bus, wherein the memory is stored with a machine-readable instruction executable by the processor, and when the computer apparatus is in operation, the processor and the memory are communicated through the bus, the machine-readable instruction is configured to, when executed by the processor, perform the above-mentioned data processing method, or steps in any one of the optional implementations in the method.

An embodiment of the present disclosure provides a computer-readable storage medium, the computer-readable storage medium has a computer program stored thereon, and the computer program is configured to, when executed by a processor, perform the above-mentioned data processing method, or steps in any one of the optional implementations in the method.

In the data processing method provided by the embodiments of the present disclosure, by sizes of write data received within a preset time respectively indicated by respective write requests, a size threshold value for classifying data update types can be accurately determined, thereby accurately determining the data update types to which the write requests correspond, and data blocks of different data update types are divided into different cache regions, which can realize the efficient management of write data with different update frequencies.

In order to make the above objects, features and advantages of the present disclosure more apparent, the following detailed description of the preferred embodiments will be given with reference to the accompanying drawings.

BRIEF DESCRIPTION OF DRAWINGS

In order to more clearly illustrate the technical solutions of the embodiments of the present disclosure, the accompanying drawings need to be used in the embodiments are briefly introduced below, the drawings herein are incorporated in and constitute a part of the specification, and illustrate embodiments consistent with the present disclosure, the drawings together with the description serve to explain the technical solutions of the present disclosure. It should be understood that, the following drawings merely illustrate certain embodiments of the present disclosure, and are therefore not to be considered limiting in scope, and other related drawings may be derived from these drawings by one of ordinary skill in the art without inventive step.

DETAILED DESCRIPTION

Figure 1:
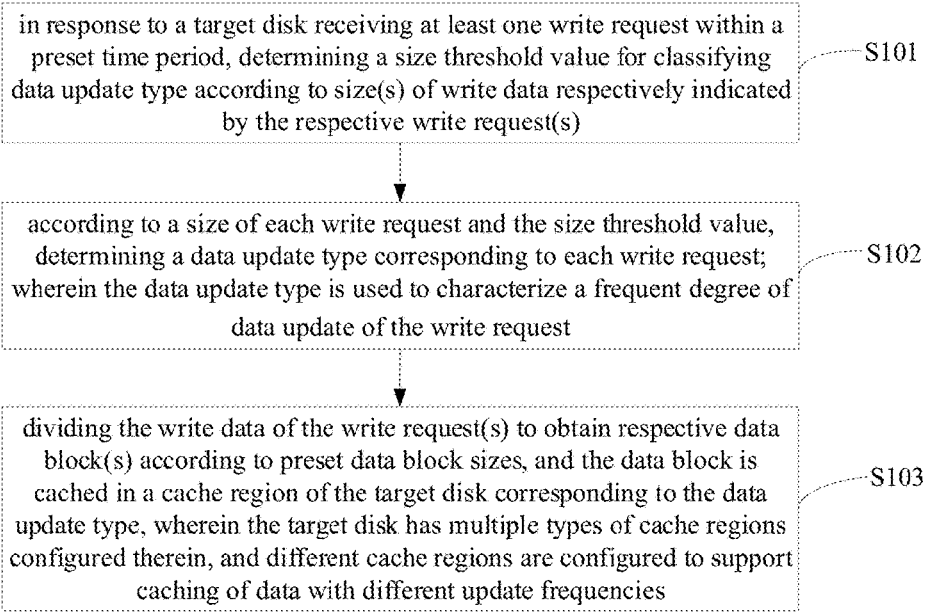
FIG. 1 illustrates a flowchart of a data processing method provided by an embodiment of the present disclosure.

In order to make the objects, technical solutions and advantages of the embodiments of the present disclosure clearer, the technical solutions in the embodiments of the present disclosure will be clearly and completely described below in conjunction with the accompanying drawings in the embodiments of the present disclosure, it is obvious that the described embodiments are only a part of the embodiments of the present disclosure, rather than all of the embodiments. Generally, the components of the embodiments of the present disclosure described and illustrated in the figures herein could be arranged and designed in a wide variety of different configurations. Therefore, the following detailed description of the embodiments of the disclosure provided in the figures is not intended to limit the claimed scope of the disclosure, but is merely representative of selected embodiments of the present disclosure. Based on the embodiments of the present disclosure, all other embodiments obtained by those skilled in the art without making creative labor belong to the scope of protection of the present disclosure.

The amount of data in the big data era grows exponentially, and shingled magnetic recording disk, as a cost-effective storage medium, can achieve high capacity storage by partially overlapping data tracks on the disk. However, write operations performed in SMR disk would destroy the valid data on adjacent tracks, and therefore, during the process of writing data, the valid data of adjacent tracks must be read into the internal memory, and the data to be modified is combined with the newly written data, and then written back to the storage region of the SMR disk.

Whereas for host managed-SMR disk, a reserved conventional magnetic recording region is served as a persistent cache region for caching data. Whereas the persistent cache region needs to be cleaned in a timely manner to ensure that there has available space. Therefore, how to effectively clean CMR region in HM-SMR disk is an urgent problem to be solved.

Based on this, the present disclosure provides a data processing method, in which by sizes of respective write data received within a preset time, a size threshold value for dividing data update types can be accurately determined, thereby accurately determining a data update type to which a write request corresponds, and data blocks of different data update types are divided into different cache regions, write data with different update frequencies can be efficiently managed.

The deficiencies existed in the above solutions and the proposed solutions for addressing the deficiencies are all results obtained by the inventor after practice and careful study, and therefore, the discovery process of the above problems and the solution proposed by the present disclosure to the above problems hereinafter should be contributions made by the inventor to the present disclosure during the course of the present disclosure.

It should be noted that: similar numerals and letters represent similar items in the following figures, therefore, once an item is defined in one figure, it need not be further defined and explained in the subsequent figures.

It can be understood that, before using the technical solution disclosed by the embodiments of the present disclosure, the user should be informed of the type, the use range, the use scenario, and the like of the personal information to which the present disclosure relates and obtain the authorization of the user in an appropriate manner in accordance with the relevant laws and regulations.

In order to facilitate understanding of the present embodiments, a data processing method disclosed by an embodiment of the present disclosure will be firstly described in detail, the execution subject of the data processing method provided by the embodiment of the present disclosure is generally a computer apparatus having certain computing power.

The data processing method provided by the embodiment of the present disclosure is described below by taking the execution subject as a server as an example.

Referring to FIG. 1, a flowchart of a data processing method provided by an embodiment of the present disclosure is illustrated, the method includes S101 to S103, wherein:

S101: in response to a target disk receiving at least one write request within a preset time period, a size threshold value for classifying data update type is determined according to size(s) of write data respectively indicated by the respective write request(s).

S102: according to a size of each write request and the size threshold value, a data update type corresponding to each write request is determined; wherein the data update type is used to characterize a frequent degree of data update of the write request.

Figure 2:
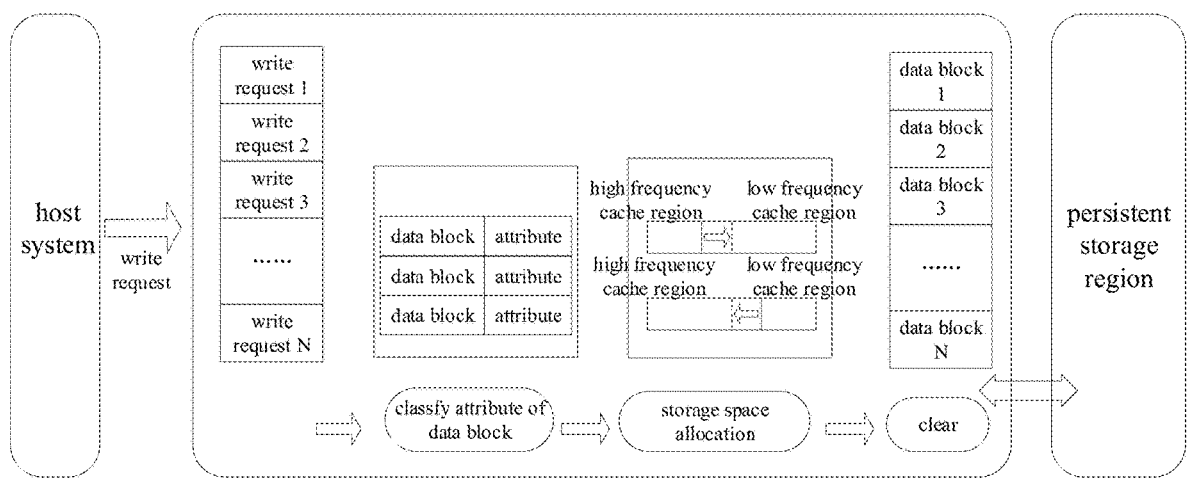
FIG. 2 illustrates a flowchart of another data processing method provided by an embodiment of the present disclosure.
Figure 3:
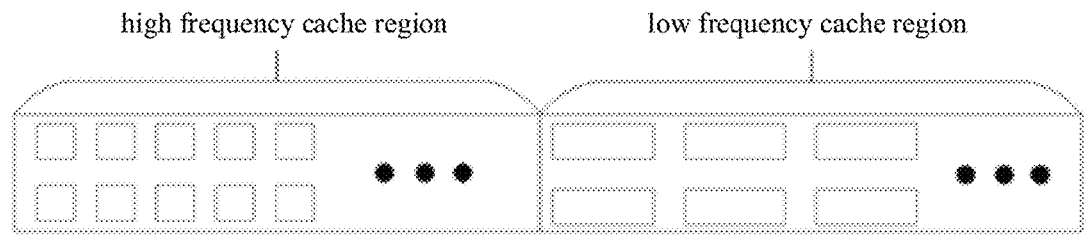
FIG. 3 illustrates a schematic diagram of partitioning of a cache region provided by an embodiment of the present disclosure.

In an embodiment of the present disclosure, the target disk may refer to an HM-SMR disk. In another flowchart of a data processing method illustrated in FIG. 2, a host system may send a write request carrying associated write data of an upper-tier application to a target disk, so as to realize writing of the write data corresponding to the write request to the target disk.

In an embodiment of the present disclosure, the data update type to which the write request corresponds may be classified according to the size of the write data indicated by the write request and the size threshold value. In one implementation, the size threshold value used to classify the data update type may be determined according to the size(s) of the write data respectively indicated by the respective write request(s).

In the above implementation, the size threshold value may be derived according to the following formula:

$$\text{Hot\_Write}_{threshold} = \frac{\sum_{i=1}^{N} \text{write\_request\_size}_i}{\text{WINDOW\_LENGTH}}.$$

Wherein, $\text{Hot\_Write}_{threshold}$ represents the size threshold value; $\text{write\_request\_size}_i$ represents the size of the respective write data; N represents the number of write requests; WINDOW_LENGTH represents a preset request window length, that is, an interval in which write data is collected (a time period in which write data is collected).

As can be seen from the above formula, the size threshold value is determined according to the ratio of the size(s) of the write data indicated by the received respective write request(s) to the preset request window length.

Herein, both the number of write request(s) and the request window length are preset, therefore, it can be seen that the size threshold value is a dynamic threshold value. In an specific implementation, the size threshold value may be calculated every other preset number of write request(s), or the size threshold value may be calculated once with the latest preset number of write request(s). Illustratively, the number of write requests may be set to be 1024, that is, the size threshold value may be determined after receiving 1024 write requests.

The write request may be determined to be of a first type in the case that the size of the write data corresponding to the write request is greater than or equal to the size threshold value; the write request may be determined to be of a second type in the case that the size of the write data corresponding to the write request is less than the size threshold value.

Wherein, the write data corresponding to the write request of the first type corresponds to an update frequent degree lower than the update frequent degree corresponding to the write data that corresponds to the write request of the second type. Herein, the write data corresponding to the first type of write request may also be referred to as a cold data, and the write data corresponding to the second type of write request may also be referred to as a hot data. Wherein, the update frequent degree may indicate an update frequency.

S103: the write data of the write requests are divided to obtain respective data blocks according to preset data block sizes, and the data blocks are cached in cache regions of the target disk corresponding to the data update types, wherein the target disk has multiple types of cache regions configured therein, and different cache regions are configured to support caching of data with different update frequencies.

The various cache regions of the target disk refer to the respective cache regions in a persistent cache region (CMR partition) of the target disk. Different cache regions may cache different types of write data.

In an implementation, in the case that the write requests are divided into the first type and the second type, the persistent cache region may be divided into a high frequency cache region and a low frequency cache region. Wherein, the high frequency cache region is configured to cache write data corresponding to write request(s) of the first type; the low frequency cache region is used to cache write data corresponding to write request(s) of the second type.

In the process of caching write data corresponding to different types of write requests in the respective cache regions, the write data of the write requests may first be divided into respective data blocks. The size of each data block may be determined according to the size of the physical storage space in the target disk (which may serve as a preset data block size). Illustratively, the write data of a write request may be classified as a data block of 4 KB.

Thereafter, these divided data blocks are then cached in corresponding cache regions. That is, in one implementation, the respective data block(s) obtained after dividing the write data of the write request(s) of the first type is/are cached in the high frequency cache region; the respective data block(s) obtained after dividing the write data of the write request(s) of the second type is/are cached in the low frequency cache region.

For the data blocks to be cached in the low frequency cache region, each data block may be statically mapped into a specific memory segment, and the respective specific memory segment is constituted by 16 consecutive data blocks.

For a data block need to be cached in the high frequency cache region, a latest storage location thereof may be determined according to a marked attribute information of the data block in the target disk and a historical storage location of the data block in the high frequency cache region.

In an implementation, when performing the step of caching the respective data block(s) of write request(s) of the first type in the high frequency cache region, it is specifically possible to perform the follows:

For each data block to which write request of the first type corresponds, in the case that the data block is the same as a cached data block in the target disk, determining a latest storage location of the data block in the high frequency cache region based on a marked attribute information of the data block in the target disk and a historical storage location of the data block in the high frequency cache region;

wherein, the attribute information is used to indicate an update period length information of the data block.

In the above implementation, the marked attribute information of the data block in the target disk may be determined based on the update period length information of the data block. Wherein, the update period length information may be expressed as a reuse distance, that is, the number of data blocks in the interval between this update and the last update.

The attribute information of the data blocks may specifically include four kinds of attribute information, that is, a first attribute information, a second attribute information, a third attribute information, and a fourth attribute information. The update period lengths corresponding to different attribute information are different. And the above data blocks with different attribute information may include traffic data blocks and metadata blocks. The traffic data block refers to the traffic data of the upper-tier application; the metadata block is used to describe a storage attribute information of a traffic data block.

To facilitate management of these data blocks, in one implementation, a filter stack and a resident stack based on least recently used (LRU) storage logic may be used to manage data blocks with different attribute information. Illustratively, the length of the filter stack to the length of the resident stack may be set to be 1:9.

Herein, the filter stack may be used to store traffic data blocks among the data blocks, and the filter stack may only store the latest data block cached into the high frequency cache region or data block(s) degraded from the resident stack. The resident stack may be used to store metadata blocks and traffic data blocks with shorter update period. The update period of the traffic data block stored in the resident stack is shorter than the update period of the traffic data block stored in the filter stack. In the case that the update period of a traffic data block in the resident stack becomes longer, that is, update is not occurred thereto within a preset time period, it may be degraded into the filter stack.

The first attribute information indicates that the data block is a metadata block that is written to the target disk for the first time, corresponding to a write request being of the first type, and not existed within the resident stack of the high frequency cache region. Herein, since the first attribute information indicates that the data block is written to the target disk for the first time, a reuse distance has not been generated, and there is no corresponding traffic data block, the data block may be referred to as a shadow block. Herein, since the shadow block is a metadata block, it is impossible that the shadow block exists in the filter stack of the high frequency cache region. Therefore, the shadow block being not existed within the resident stack of the high frequency cache region, represents that it may exist in the low frequency cache region, or it may exist in the persistent storage region, i.e., the SMR partition of the target disk.

The second attribute information indicates that the data block is a traffic data block having an update period greater than or equal to a first set threshold value. Herein, the data block marked with the second attribute information is a traffic data block having the longest update period among the four types of attribute information, and may be referred to as a long reuse distance (LRD) block. The LRD blocks stored into the high frequency cache region for the first time are all placed in the filter stack until being updated again.

The third attribute information indicates that the data block is a traffic data block having an update period smaller than a second set threshold value. Herein, the update period of the data block marked with the third attribute information is shorter than the update period of the data block marked with the second attribute information, and may be referred to as a short reuse distance (SRD) block. Herein, the second set threshold value is less than or equal to the first set threshold value.

The fourth attribute information indicates that the data block is a metadata block in which a traffic data block is removed out of the filter stack of the high frequency cache region. The reason that the traffic data block is removed from the filter stack of the high frequency cache region is that the storage space of the high frequency cache region is full. After the traffic data block is removed from the filter stack of the high frequency cache region, the corresponding traffic data block is already not existed in the high frequency cache region, that is, may be existed in the low frequency cache region, or stored in the persistent storage region, i.e., the SMR partition of the target disk, the metadata block corresponding to such a traffic data block may be referred to as a ghost block.

In view of that the marked attribute information of the data blocks in the target disk may include the above four kinds of attribute information, specific processes for determining the latest storage locations of the data blocks in the high frequency cache region will be respectively described in detail below with respect to the above four kinds of attribute information, based on the marked attribute information of the data blocks in the target disk and historical storage locations of the data blocks in the high frequency cache region, in the case that the data blocks are the same as cached data blocks in the target disk.

(1) The Marked Attribute Information of the Data Block in the Target Disk is the First Attribute Information.

In this case, determining the latest storage location of the data block in the high frequency cache region based on the marked attribute information of the data block in the target disk and the historical storage location of the data block in the high frequency cache region, includes:

Step 11: updating the first attribute information to which the data block corresponds to the second attribute information, and determining a traffic data block to which the metadata block corresponds;

Step 12: in the case that the metadata block does not exist within the resident stack of the high frequency cache region and is updated to the second attribute information, determining that the latest storage location of the metadata block is the location of the resident stack, and determining that the storage location of the traffic data block in the high frequency cache region is the location of the filter stack.

Here, when a data block marked with the first attribute information (i.e., a shadow block) is hit, the first attribute information of the shadow block may be updated to the second attribute information, that is, updated to be an LRD block, the shadow block may reside in the high frequency cache region. At this time, the traffic data block to which the metadata block corresponds can be determined.

The historical storage location of the metadata block may be in the low frequency cache region or the persistent storage region, in this case, the latest storage location of the metadata block can be determined as the location of the resident stack in the high frequency cache region. And, the traffic data block to which the metadata block corresponds is now a new LRD block, therefore, it can be determined that the storage location of the LRD block in the high frequency cache region is the location of the filter stack, which may specifically be the most recently used (MRU) end of the filter stack.

(2) The Marked Attribute Information of the Data Block in the Target Disk is the Second Attribute Information.

In this case, determining the latest storage location of the data block in the high frequency cache region based on the marked attribute information of the data block in the target disk and a historical storage location of the data block in the high frequency cache region, includes:

step 21: in the case that the data block exists in both the resident stack and the filter stack, updating the second attribute information of the data block to the third attribute information;

step 22: determining that the latest storage location of the data block is the most recently used end of the resident stack.

Here, the data block exists in both the resident stack and the filter stack, and in the case that the data block is the same as a data block already cached in the target disk, that is, the data block marked with the second attribute information is hit, the data block can be updated to be a SRD block, that is, the update period of the data block is shortened, and therefore, the new SRD block can be stored at the MRU end of the resident stack, that is, the latest storage location of the data block is determined to be the MRU end of the resident stack. At the same time, the data block in the filter stack may be deleted.

And, the SRD block residing at the bottom of the resident stack may be degraded to be an LRD block, and the latest storage location of the new LRD block is determined to be the least recently used (LRU) end of the filter stack. Furthermore, other data blocks between the SRD block at the bottom of the resident stack before the degradation and the SRD block at the bottom of the resident stack after the degradation also need to be deleted.

(3) The Marked Attribute Information of the Data Block in the Target Disk is the Second Attribute Information.

In this case, determining the latest storage location of the data block in the high frequency cache region based on the marked attribute information of the data block in the target disk and a historical storage location of the data block in the high frequency cache region, includes:

in the case that the data block is migrated from the resident stack to the filter stack, determining that the latest storage location of the data block is the most recently used end of the filter stack.

Here, in the case that the data block is the same as a data block already cached in the target disk, that is, the data block marked with the second attribute information is hit, the data block may be migrated from the filter stack back to the resident stack. Therefore, it can be determined that the latest storage location of the data block is the MRU end of the resident stack.

(4) The Marked Attribute Information of the Data Block in the Target Disk is the Third Attribute Information.

In this case, determining the latest storage location of the data block in the high frequency cache region based on the marked attribute information of the data block in the target disk and a historical storage location of the data block in the high frequency cache region, includes:

In the case that the data block is a traffic data block with an update period less than a second set threshold value and is stored in a resident stack, determining that the latest storage location of the data block is the most recently used end of the resident stack.

Here, in the case that the data block is a traffic data block with an update period less than the second set threshold value, that is, the data block is an SRD block. In the case that the SRD block is stored in the resident stack and is hit, the SRD block may be migrated to the MRU end of the resident stack. If the SRD block is at the bottom of the resident stack prior to the migration, then other data blocks between the SRD block at the bottom of the resident stack prior to migration and the SRD block at the bottom of the resident stack after migration also need to be deleted.

(5) The Marked Attribute Information of the Data Block in the Target Disk is the Fourth Attribute Information.

In this case, determining the latest storage location of the data block in the high frequency cache region based on the marked attribute information of the data block in the target disk and a historical storage location of the data block in the high frequency cache region, includes:

step 31: updating the fourth attribute information of the data block to be a third attribute information;

step 32: in the case that the data block is a metadata block that is moved out of the filter stack of the high frequency cache region and is updated to the third attribute information, determining that the latest storage location of the data block is the most recently used end of the resident stack of the high frequency cache region.

Herein, the reason that the data block is removed from the filter stack in the high frequency cache region is that there is no storage space left in the high frequency cache region, the corresponding traffic data block is not already present in the high frequency cache region, and may be present in the low frequency cache region, or may be present in the persistent storage region. In the case that the data block marked with the fourth attribute information is hit, it represents that the data block has a longer update period and a higher update frequency, at this time, the fourth attribute information of this data block can be updated to the third attribute information. And, this data block can be stored to the MRU end of the resident stack.

The above is processes for caching write data corresponding to different types of write requests. In the reading process, the target data block may be searched in the order of the high frequency cache region, the low frequency cache region and the persistent storage region.

During system initialization, the ratio of the storage space corresponding to the high frequency cache region to the storage space corresponding to the low frequency cache region may be set to be 1:3, for example. In the process of caching write data, the space usage of the high frequency cache region and the low frequency cache region may be examined after each sampling period (e.g., every 1000 write requests being received) to determine whether the ratio of the storage space corresponding to the high frequency cache region to the storage space corresponding to the low frequency cache region needs to be adjusted. When the number of cached data blocks in the respective cache region reaches a set threshold value, the data blocks within the respective cache region may be cleared.

In an implementation, when the number of cached data blocks in the respective cache region reaches a set threshold value, the data blocks within the respective cache region are cleared.

Here, there may be differences in the processes of clearing data blocks for different cache regions. The processes of clearing the data blocks in the respective cache regions will be described in detail below with respect to an example in which the cache regions include a high frequency cache region and a low frequency cache region.

Specifically, when the number of data blocks cached in the low frequency cache region reaches a third set threshold value, the data blocks within the low frequency cache region may be cleared according to the following steps:

step 41: in the case that the number of data blocks cached in the low frequency cache region reaches a third set threshold value, determining weights of the respective data blocks according to the number of data blocks cached in the low frequency cache region and the corresponding degrees of fragmentation of the respective data blocks; The degree of fragmentation is used to indicate a degree of dispersion of the data block in the low frequency cache region; The degree of fragmentation is determined according to the number of data blocks in the persistent storage region, the number of data blocks pointed to by the write pointer, and the number of data blocks cached in the low frequency cache region of the target disk;

step 42: the data block(s) within the low frequency cache region is/are cleared and written back to the persistent storage region according to the weights of respective data blocks.

Here, the fragmentation degree FL may be obtained according to the following formula:

$$FL = \begin{cases} \dfrac{\sum_{i=1}^{N} \text{native\_block}_i}{\text{Block\_Offset}(\text{victim\_block}_n - wp)} & vb \geq wp \\ \dfrac{\sum_{i=1}^{N} \text{native\_block}_i + \sum_{j=1}^{N} \text{victim\_block}_j}{\text{Block\_Offset}(wp)} & vb < wp \end{cases}$$

Wherein, native_block represents a data block stored in the persistent storage region; victim_block (i.e. vb) represents a data block in the low frequency cache region; wp (i.e., write_pointer) represents a data block to which the write pointer points in the target disk.

After determining the fragmentation degree FL, the weight of each data block can be determined according to the following formula:

Victim_weight=chunk_cnt*$FL_{victim}$,

Wherein, chunk_cnt represents the number of data blocks to be written back into the persistent storage area.

In the case that the number of data blocks cached in the high frequency cache region reaches a fourth set threshold value, the data blocks within the high frequency cache region may be cleared according to the following steps:

In the case that the number of data blocks cached in the high frequency cache region reaches a fourth threshold value, the data blocks in the high frequency cache region are cleared and cached into the low frequency cache region according to the arrangement order of the data blocks at the least recently used end of the filter stack; the filter stack is used to store traffic data blocks among the data blocks.

Here, the garbage collector need only search for data block(s) to be written back to the persistent storage region from the LRU end of the filter stack when cleaning the data block(s) of the high frequency cache region. The number of cleaned data block(s) in the high frequency cache region is related to the presence of mapped data block(s) in the low frequency cache region. That is, the garbage collector clears only one data block at a time if the corresponding data block already exists in the low frequency cache region; Conversely, adjacent data blocks in the filter stack are evicted in bulk to fully utilize the storage space of the data blocks.

In order to prevent the loss of metadata during the cleaning of the data blocks, the metadata in the internal memory may be synchronized with the metadata in the CMR region on the target disk at a preset period. For example, metadata may be synchronized from random access memory (RMA) to the CMR partition of the target disk every 30 seconds. Wherein, a first CMR partition in the target disk may be used to store metadata.

It is understood by those skilled in the art that, in the above described methods of the specific implementation, the order in which the steps are described does not imply a strict order of execution and does not constitute any limitation on the implementation of the process, and that the specific execution order of the steps should be determined by their functionality and possible internal logic.

Based on the same inventive concept, a data processing device corresponding to the data processing method is further provided in the embodiment of the present disclosure, since the principle of solving the problem by the device in the embodiment of the present disclosure is similar to the above-mentioned data processing method of the embodiment of the present disclosure, the implementation of the device can be referred to the implementation of the method, and repetitions will not be described again.

Figure 4:
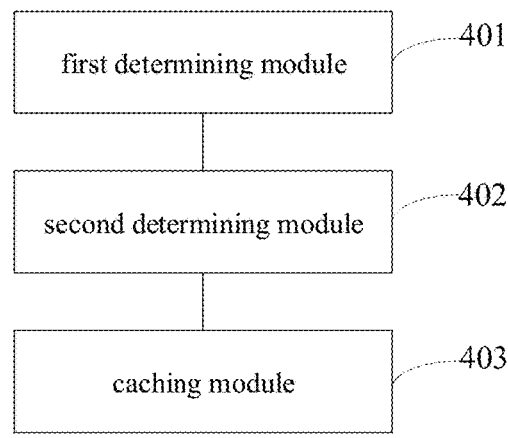
FIG. 4 illustrates a schematic structural view of a data processing device provided by an embodiment of the present disclosure.

Referring to FIG. 4, a schematic structural view of a data processing device according to an embodiment of the present disclosure is illustrated, and the device includes:

a first determining module 401, configured to, in response to a target disk receiving at least one write request within a preset time period, determine a size threshold value for classifying a data update type according to size(s) of write data respectively indicated by the respective write request(s);

a second determining module 402, configured to determine a data update type corresponding to each write request according to a size of each write request and the size threshold value; Wherein, the data update type is used to characterize the frequent degree of data update of the write request;

a caching module 403, configured to classify the write data of the write request(s) and obtain respective data block(s) according to preset data block size(s), and cache the data block(s) in cache region(s) of the target disk corresponding to the data update type(s), wherein the target disk has multiple types of cache regions configured therein, and different cache regions are configured to support caching of data with different update frequencies.

In an alternative implementation, the cache regions include a high frequency cache region for caching write data corresponding to a write request of a first type and a low frequency cache region for caching write data corresponding to a write request of a second type;

The caching module 403 is specifically configured for:
determining that the data update type of the write request is the first type in the case that the size of the write request is less than or equal to the size threshold value, otherwise, determining that the data update type of the write request is the second type;
caching the respective data block(s) of the write request of the first type in the high frequency cache region; and caching the respective data block(s) of the write request of the second type in the low frequency cache region.

In an optional implementation, the caching module 403 is configured to:
for each data block to which the write request of the first type corresponds, in a case where the data block is the same as a cached data block in the target disk, determine a latest storage location of the data block in the high frequency cache region based on the marked attribute information of the data block in the target disk and a historical storage location of the data block in the high frequency cache region; the attribute information is used to indicate update period length information of the data block.

In an alternative implementation, the marked attribute information of the data block in the target disk is a first attribute information; the first attribute information indicates that the data block is a metadata block that is written to the target disk for the first time, corresponding to a write request being of the first type, and does not exist within a resident stack of the high frequency cache region; the resident stack is used to store the metadata block;

the caching module 403 is specifically configured to:
update the first attribute information corresponding to the data block to a second attribute information, and determine a traffic data block corresponding to the metadata block; wherein the second attribute information indicates that the data block is a traffic data block with an update period greater than or equal to a first set threshold value;

in the case that the metadata block does not exist in a resident stack of the high frequency cache region and is updated to the second attribute information, determine that a latest storage location of the metadata block is a location of the resident stack, and determine that a storage location of the traffic data block in the high frequency cache region is a location of a filter stack; wherein the resident stack is configured to store the metadata block; the filter stack is configured to store the traffic data block.

In an optional implementation, the marked attribute of the data block in the target disk is second attribute information; the second attribute information indicates that the data block is a traffic data block with an update period greater than or equal to a first set threshold value;

the caching module 403 is specifically configured to:
update the second attribute information of the data block to a third attribute information in the case that the data block exists in both the resident stack and the filter stack; wherein the third attribute information indicates that the data block is a traffic data block having an update period smaller than a second set threshold value; the resident stack and the filter stack are used to store traffic data blocks in the data block, and an update period of the traffic data block stored in the resident stack is shorter than an update period of the traffic data block stored in the filter stack; the second set threshold value is less than or equal to the first set threshold value; and determine that a latest storage location of the data block is the most recently used end of the resident stack.

In an optional implementation, the marked attribute of the data block in the target disk is second attribute information; the second attribute information indicates that the data block is a traffic data block having an update period greater than or equal to a first set threshold value;

the caching module 403 is specifically configured to:
in the case that the data block is migrated from a resident stack to a filter stack, determine that a latest storage location of the data block is a most recently used end of the resident stack; wherein the resident stack and the filter stack are configured to store traffic data blocks in the data block, and an update period of the traffic data block stored in the resident stack is shorter than an update period of the traffic data block stored in the filter stack.

In an optional implementation, the marked attribute of the data block in the target disk is a third attribute information; the third attribute information indicates that the data block is a traffic data block having an update period smaller than a second set threshold value;

the caching module 403 is specifically configured to:
in the case that the data block is a traffic data block having an update period less than the second set threshold value and is stored in a resident stack, determine that the latest storage location of the data block is the most recently used end of the resident stack; wherein the resident stack is configured to store the traffic data block.

In an optional implementation, the marked attribute of the data block in the target disk is a fourth attribute information; the fourth attribute information indicates that the data block is a metadata block in which a traffic data block is moved out of a filter stack of the high frequency cache region; the filter stack is used to store the traffic data block;

the caching module 403 is specifically configured to:
update the fourth attribute information of the data block to a third attribute information; wherein the third attribute information indicates that the data block is a traffic data block having an update period smaller than a second set threshold value;

in the case that the data block is a metadata block moved out of a filter stack of the high frequency cache region and updated to the third attribute information, determine that a latest storage location of the data block is a most recently used end of a resident stack in the high frequency cache region; wherein the resident stack is configured to store the traffic data block; the update period of the traffic data block stored in the resident stack is shorter than the update period of the traffic data block stored in the filter stack.

In an optional implementation, the device further includes:
a first cleaning module, configured to:
in the case that the number of data blocks cached in the low frequency cache region reaches a third set threshold value, determine weights of the respective data blocks according to the number of data blocks cached in the low frequency cache region and the corresponding fragmentation degrees of the respective data blocks; The fragmentation degree is used to indicate a degree of dispersion of the data block in the low frequency cache region; The fragmentation degree is determined according to the number of data blocks in the persistent storage region, the number of data blocks pointed to by the write pointer, and the number of data blocks cached in the low frequency cache region of the target disk;
write data block having a weight that meets a first preset condition back to the persistent storage region according to the weights of the respective data blocks.

In an optional implementation, the device further includes:
a second cleaning module, configured to:
in the case that the number of data blocks cached in the high frequency cache region reaches a fourth threshold value, cache a data block in an arrangement location meeting a second preset condition into the low frequency cache region according to the arrangement order of the data blocks at the least recently used end of the filter stack; wherein the filter stack is used to store traffic data blocks among the data blocks.

The description of the process flow of the respective modules in the device, and the interaction flow between the respective modules can refer to the related description in the above method embodiments, which will not be described in detail here.

Figure 5:
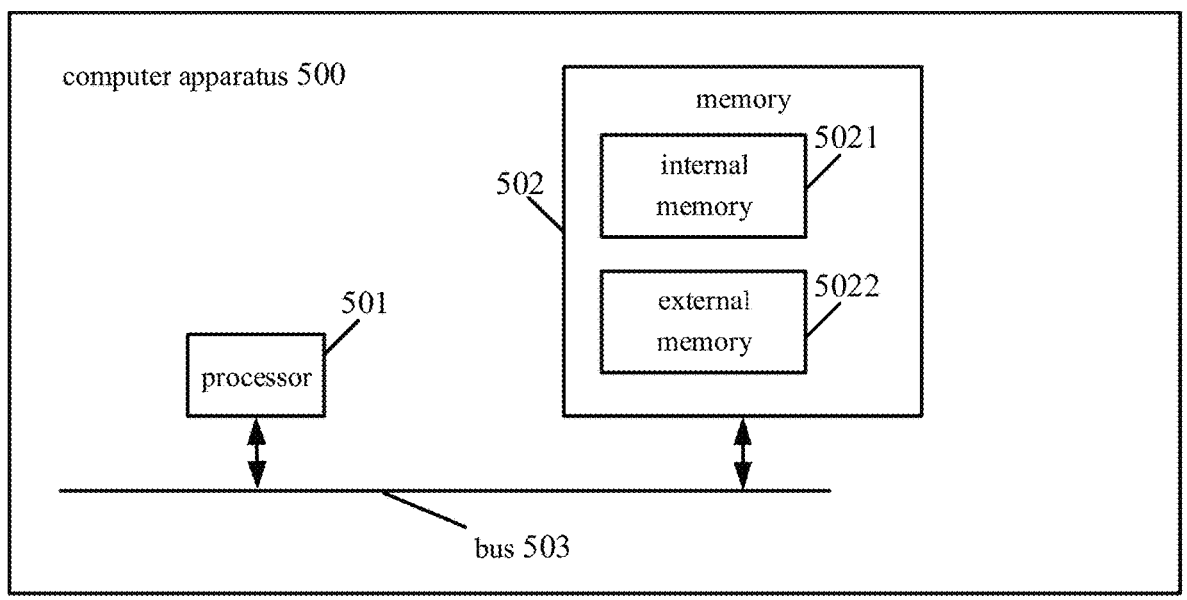
FIG. 5 illustrates a schematic view of a computer apparatus provided by an embodiment of the present disclosure.

Based on the same technical conception, an embodiment of the present disclosure further provides a computer apparatus. Referring to FIG. 5, a schematic structural view of a computer apparatus 500 provided by an embodiment of the present disclosure is illustrated, the computer apparatus 500 includes a processor 501, a memory 502, and a bus 503. Wherein, the memory 502 is used to store execution instructions, and includes an internal memory 5021 and an external memory 5022; Here, the internal memory 5021 is also referred to as an inter-memory, and is used to temporarily store arithmetic data in the processor 501, and data exchanged with an external memory 5022 such as a hard disk, and the processor 501 exchanges data with the external memory 5022 through the internal memory 5021, when the computer apparatus 500 is operating, the processor 501 and the memory 502 communicates through the bus 503, so that the processor 501 executes the following instructions:

- in response to a target disk receiving at least one write request within a preset time period, determining a size threshold value for classifying a data update type according to size(s) of write data respectively indicated by the respective write request(s);
- determining the data update type corresponding to each write request based on a size of each write request and the size threshold value; Wherein, the data update type is used to characterize the frequent degree of the data update of the write request;
- classifying the write data of the write request(s) to obtain respective data block(s) according to preset data block size(s), and caching the data block(s) into cache region(s) of the target disk corresponding to the data update type(s), wherein the target disk has multiple types of cache regions configured therein, and different cache regions are configured to support caching of data with different update frequencies.

An embodiment of the present disclosure further provides a computer-readable storage medium, the computer-readable storage medium has a computer program stored thereon, when executed by a processor, the computer program executes the steps of the data processing method described in the above method embodiments. Wherein, the storage medium may be a volatile or non-volatile computer-readable storage medium.

An embodiment of the present disclosure further provides a computer program product carrying program code, the program code includes instructions for executing the steps of the data processing method described in the above method embodiments, which can be specifically referred to the above method embodiments, and are not described in detail here.

Wherein, the above-mentioned computer program product may be specifically implemented by means of hardware, software, or a combination thereof. In one optional embodiment, the computer program product is specifically embodied as a computer storage medium, and in another optional embodiment, the computer program product is specifically embodied as a software product, such as a software development kit (SDK) or the like.

It can be clearly understood by those skilled in the art that, for convenience and brevity of description, the specific working processes of the above-mentioned device may refer to the corresponding processes in the foregoing method embodiments, which are not repeated here. In the several embodiments provided by the present disclosure, it is understood that, the disclosed device and method may be implemented in other ways. The device embodiments described above are merely illustrative, for example, the division of a unit is merely one kind of logical function division, and other division methods may be actually implemented, and for example, multiple units or components may be combined or integrated into another system, or some features may be omitted or not executed. Further, coupling or direct coupling or communication connection between each other shown or discussed may be an indirect coupling or communication connection between devices or units through some communication interface, and may be electrical, mechanical or in other manner.

The unit illustrated as separate elements may be or may not be physically separate, and the element shown as a unit may be or may not be a physical unit, i.e. may be located at one place, or may be distributed over a plurality of network units. part or all of the unit may be selected according to actual needs to achieve the purpose of the present embodiment.

In addition, in respective embodiments of the present disclosure, the respective functional units may be integrated in one processing unit, or the respective units may be physically present separately, or two or more units may be integrated in one unit.

If the function is implemented in the form of a software functional unit and sold or used as an independent product, it may be stored in a processor-executable non-volatile computer-readable storage medium. Based on such an understanding, the technical solution of the present disclosure in essence or a part contributing to the prior art or a part of the technical solution may be embodied in the form of a software product, the computer software product is stored in a storage medium, and includes a plurality of instructions for making a computer apparatus (which may be a personal computer, a server, or a network apparatus, etc.) perform all or a part of the steps of the methods of the respective embodiments of the present disclosure. The aforementioned storage medium include various mediums that can store program codes, such as a U disk, a mobile hard disk, a read-only memory (ROM), a random access memory (RAM), a magnetic disk, or an optical disk or the like.

Finally, it should be noted that, the above-described embodiments are only specific implementations of the present disclosure to illustrate the technical solutions of the present disclosure rather than to limit the present disclosure, and the scope of protection of the present disclosure is not limited thereto. Although the present disclosure has been described in detail with reference to the foregoing embodiments, those skilled in the art should understand that, any person skilled in the art may modify the technical solutions described in the foregoing embodiments or may easily conceive of variations, or may make equivalent replacement of some technical features in the above-mentioned embodiments, within the technical scope of the present disclosure; While these modifications, variations or replacements, which do not make the essence of the corresponding technical solutions depart from the spirit and scope of the technical solutions of the embodiments of the present disclosure, shall be included within the protection scope of the present disclosure. Therefore, the protection scope of the present disclosure should be subject to the protection scope of the claims.

The invention claimed is:

1. A data processing method, characterized by comprising:

in response to a target disk receiving at least one write request within a preset time period, determining a size threshold value for classifying a data update type according to a size of write data respectively indicated by each write request of the at least one write request;

determining a data update type corresponding to each write request according to a size of the each write request and the size threshold value; wherein the data update type is used to characterize a frequent degree of data update of a write request;

dividing write data of the write request to obtain a data block according to a preset data block size, and caching the data block in a cache region of the target disk corresponding to the data update type, wherein the target disk has multiple types of cache regions configured therein, and different cache regions are configured to support caching of data with different update frequencies.

2. The method of claim 1, characterized in that, the cache regions comprise a high frequency cache region for caching a write data corresponding to a write request of a first type and a low frequency cache region for caching a write data corresponding to a write request of a second type;

the caching the data block in the cache region of the target disk corresponding to the data update type comprises:

determining that the data update type of the write request is the first type in the case that a size of the write request is less than or equal to the size threshold value, otherwise, determining that the data update type of the write request is the second type;

caching each data block of the write request of the first type in the high frequency cache region; and caching each data block of the write request of the second type in the low frequency cache region.

3. The method of claim 2, characterized in that, the caching each data block of the write request of the first type in the high frequency cache region comprises:

for each data block to which the write request of the first type corresponds, in a case that the data block is the same as a cached data block in the target disk, determining that a latest storage location of the data block in the high frequency cache region based on a marked attribute information of the data block in the target disk and a historical storage location of the data block in the high frequency cache region; wherein the attribute information is used to indicate an update period length information of the data block.

4. The method of claim 3, characterized in that, the marked attribute information of the data block in the target disk is a first attribute information; the first attribute information indicates that the data block is a metadata block that is written to the target disk for a first time, corresponding to a write request being of the first type, and does not exist within a resident stack of the high frequency cache region; the resident stack is configured to store the metadata block;

the determining the latest storage location of the data block in the high frequency cache region according to the marked attribute information of the data block in the target disk and the historical storage location of the data block in the high frequency cache region, comprises:

updating the first attribute information corresponding to the data block to a second attribute information, and determining a traffic data block corresponding to the metadata block; wherein the second attribute information indicates that the data block is a traffic data block with an update period greater than or equal to a first set threshold value;

in a case that the metadata block does not exist in the resident stack of the high frequency cache region and is updated to the second attribute information, determining that a latest storage location of the metadata block is a location of the resident stack, and determining that a storage location of the traffic data block in the high frequency cache region is a location of a filter stack; wherein the resident stack is configured to store the metadata block; the filter stack is configured to store the traffic data block.

5. The method of claim 3, characterized in that, the marked attribute information of the data block in the target disk is a second attribute information; the second attribute information indicates that the data block is a traffic data block with an update period greater than or equal to a first set threshold value;

the determining the latest storage location of the data block in the high frequency cache region based on the marked attribute information of the data block in the target disk and the historical storage location of the data block in the high frequency cache region, comprises:

updating the second attribute information of the data block to a third attribute information in a case that the data block exists in both the resident stack and the filter stack; wherein the third attribute information indicates that the data block is a traffic data block with an update period smaller than a second set threshold value; the resident stack and the filter stack are configured to store traffic data blocks in the data block, and an update period of the traffic data block stored in the resident stack is shorter than an update period of the traffic data block stored in the filter stack; the second set threshold value is less than or equal to the first set threshold value;

determining that the latest storage location of the data block is a most recently used end of the resident stack.

6. The method of claim 3, characterized in that, the marked attribute information of the data block in the target disk is a second attribute information; the second attribute information indicates that the data block is a traffic data block having an update period greater than or equal to a first set threshold value;

the determining the latest storage location of the data block in the high frequency cache region based on the marked attribute information of the data block in the target disk and the historical storage location of the data block in the high frequency cache region, comprises:

in a case that the data block is migrated from a resident stack to a filter stack, determining that the latest storage location of the data block is a most recently used end of the resident stack; wherein the resident stack and the filter stack are configured to store traffic data blocks in the data block, and an update period of the traffic data block stored in the resident stack is shorter than an update period of the traffic data block stored in the filter stack.

7. The method of claim 3, characterized in that, the marked attribute information of the data block in the target disk is a third attribute information; the third attribute information indicates that the data block is a traffic data block with an update period smaller than a second set threshold value;

the determining the latest storage location of the data block in the high frequency cache region based on the marked attribute information of the data block in the target disk and the historical storage location of the data block in the high frequency cache region, comprises:

in a case that the data block is a traffic data block with an update period smaller than the second set threshold value and is stored to a resident stack, determining that the latest storage location of the data block is a most recently used end of the resident stack; wherein the resident stack is configured to store the traffic data block.

8. The method of claim 3, characterized in that, the marked attribute information of the data block in the target disk is a fourth attribute information; the fourth attribute information indicates that the data block is a metadata block in which a traffic data block is moved out of a filter stack of the high frequency cache region; the filter stack is configured to store the traffic data block;

the determining the latest storage location of the data block in the high frequency cache region based on the marked attribute information of the data block in the target disk and the historical storage location of the data block in the high frequency cache region, comprises:

updating the fourth attribute information of the data block to a third attribute information; wherein the third attribute information indicates that the data block is a traffic data block having an update period smaller than a second set threshold value;

in a case that the data block is a metadata block moved out of a filter stack of the high frequency cache region and updated to the third attribute information, determining that the latest storage location of the data block is a most recently used end of a resident stack in the high frequency cache region; wherein the resident stack is configured to store the traffic data block; and an update period of the traffic data block stored in the resident stack is shorter than an update period of the traffic data block stored in the filter stack.

9. The method of claim 2, characterized by further comprising:

in a case that a number of data blocks cached in the low frequency cache region reaches a third set threshold value, determining a weight of each data block according to the number of the data blocks cached in the low frequency cache region and a fragmentation degree corresponding to each data block; wherein the fragmentation degree is used to indicate a degree of dispersion of the data block in the low frequency cache region; the fragmentation degree is determined according to a number of data blocks in a persistent storage region, a number of data blocks pointed to by a write pointer, and a number of data blocks cached in the low frequency cache region of the target disk;

writing a data block having a weight that meets a first preset condition back to the persistent storage region according to the weight of each data block.

10. The method of claim 2, characterized by further comprising:

in a case that a number of data blocks cached in the high frequency cache region reaches a fourth set threshold value, caching a data block with an arrangement location meeting a second preset condition into the low frequency cache region according to an arrangement order of data blocks at a least recently used end of a filter stack; wherein the filter stack is used to store traffic data blocks among the data blocks.

11. A data processing device, characterized by comprising:

a first determining module, configured to, in response to a target disk receiving at least one write request within a preset time period, determining a size threshold value for classifying a data update type according to a size of a write data respectively indicated by each write request of the at least one write request;

a second determining module, configured to determine a data update type corresponding to each write request according to a size of the each write request and the size threshold value; wherein the data update type is used to characterize a frequent degree of data update of a write request; and a caching module, configured to divide write data of the write request to obtain a data block according to a predetermined data block size and cache the data block in a cache region of the target disk corresponding to the data update type, wherein the target disk has multiple types of cache regions configured therein, and different cache regions are configured to support caching of data with different update frequencies.

12. A computer apparatus, characterized by, comprising: a processor, a memory and a bus, wherein the memory is stored with a machine-readable instruction executable by the processor, and when the computer apparatus is in operation, the processor and the memory are communicated through the bus, the machine-readable instruction is configured to, when executed by the processor, perform steps of the data processing method of claim 1.

13. A computer-readable storage medium, characterized in that, the computer-readable storage medium has a computer program stored thereon, and the computer program is configured to, when executed by a processor, perform steps of the data processing method of claim 1.

* * * * *